United States Patent [19]

Morissette et al.

[11] Patent Number: 5,193,610

[45] Date of Patent: Mar. 16, 1993

[54] DEFROSTABLE VENTILATION SYSTEM

[76] Inventors: René Morissette, 270 Bord de L'Eau, St-Pie de Guire, Quebec, Canada, J0G 1R0; Daniel Forest, 890 Victorin, St-Charles, Quebec, Canada, J2C 6R5; Michel Julien, 280 Benoit, St-Nicéphore, Quebec, Canada, J2A 1A2

[21] Appl. No.: 819,865

[22] Filed: Jan. 13, 1992

[30] Foreign Application Priority Data

Jan. 10, 1992 [CA] Canada .................................. 2059195

[51] Int. Cl.5 .............................................. F24H 3/02
[52] U.S. Cl. ........................................ 165/54; 165/17; 165/166; 165/909; 165/913
[58] Field of Search .................... 165/17, 54, 166, 909, 165/913

[56] References Cited

U.S. PATENT DOCUMENTS

| 3,467,176 | 9/1969 | Truhan | 165/17 |
|---|---|---|---|
| 3,968,833 | 7/1976 | Strindehag et al. | 165/17 |
| 3,980,129 | 9/1976 | Bergdahl | 165/17 |
| 4,149,590 | 4/1979 | Ospelt | 165/909 |
| 4,346,755 | 8/1982 | Alley et al. | 165/17 |
| 4,377,201 | 3/1983 | Kruse et al. | 165/909 |
| 4,391,321 | 7/1983 | Thunberg | 165/54 |
| 4,461,344 | 7/1984 | Allen et al. | 165/909 |
| 4,462,459 | 7/1984 | Schmidlin | 165/909 |
| 4,653,574 | 3/1987 | Quinlisk et al. | 165/54 |
| 4,971,137 | 11/1990 | Thompson | 165/54 |
| 5,002,118 | 3/1991 | Olmstead et al. | 165/54 |

FOREIGN PATENT DOCUMENTS

| 935841 | 11/1946 | France | 165/54 |
|---|---|---|---|
| 0100648 | 9/1978 | Japan | 165/54 |
| 0006247 | 1/1982 | Japan | 165/54 |

Primary Examiner—John K. Ford
Attorney, Agent, or Firm—Ronald S. Kosie; Robert Brouillette

[57] ABSTRACT

The present invention relates to an apparatus for defrostable ventilation systems which include an element for the transfer of heat from warm exhaust air (taken from inside a building) to cooler exterior fresh air which is drawn into the building, the system using warm interior air as defrost air for defrosting the system during cool weather. The present invention in particular provides an apparatus whereby, during a defrost cycle, the interior defrost air may circulate through both of the fresh air and exhaust air paths for delivery back into the building, i.e. the warm interior air may be confined to circulate from the interior of the building into the ventilation apparatus and back to the interior of the building. The apparatus can thus use interior air as defrost air while diminishing or avoiding the creation of a negative air pressure in the building.

8 Claims, 6 Drawing Sheets

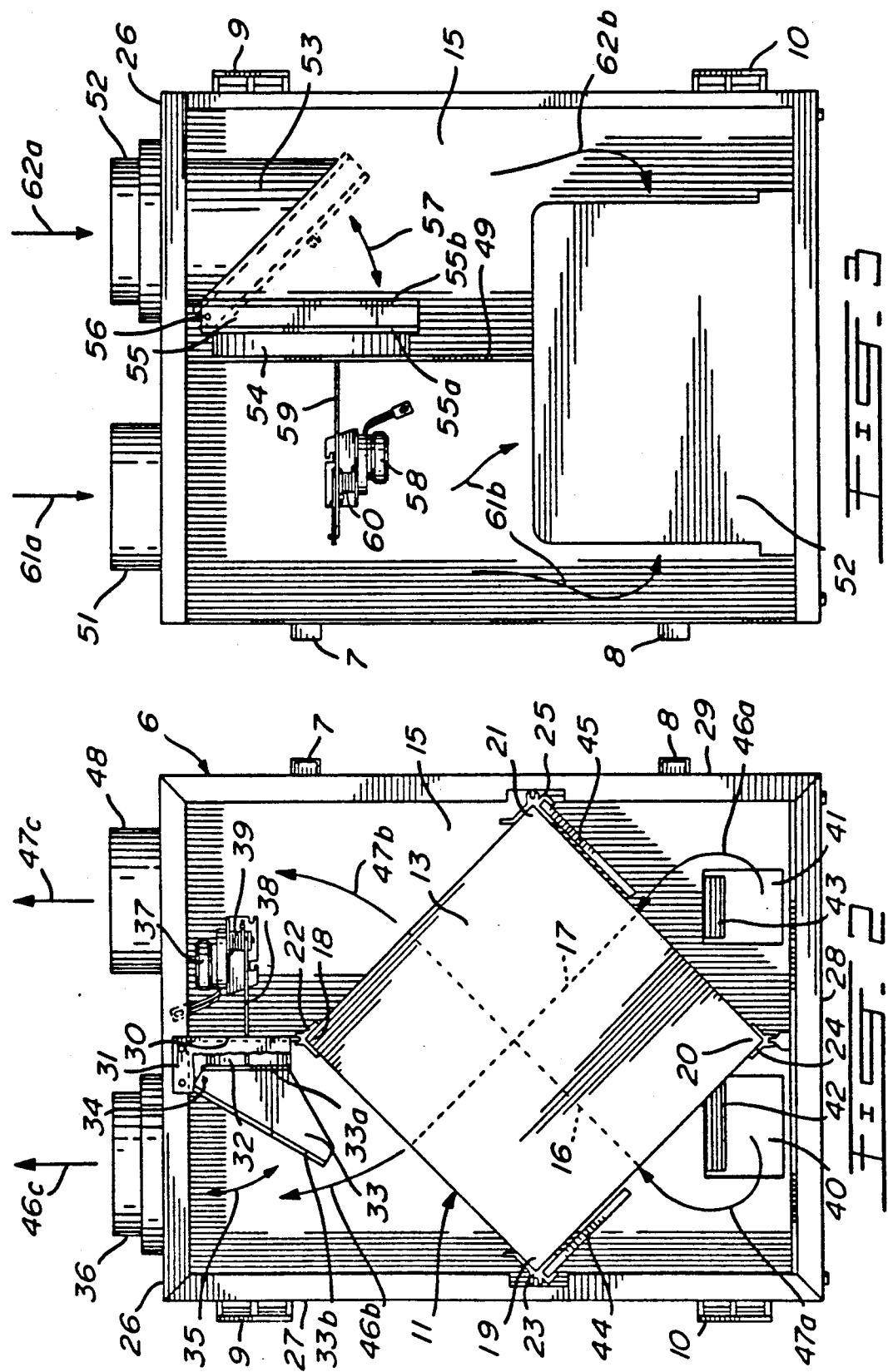

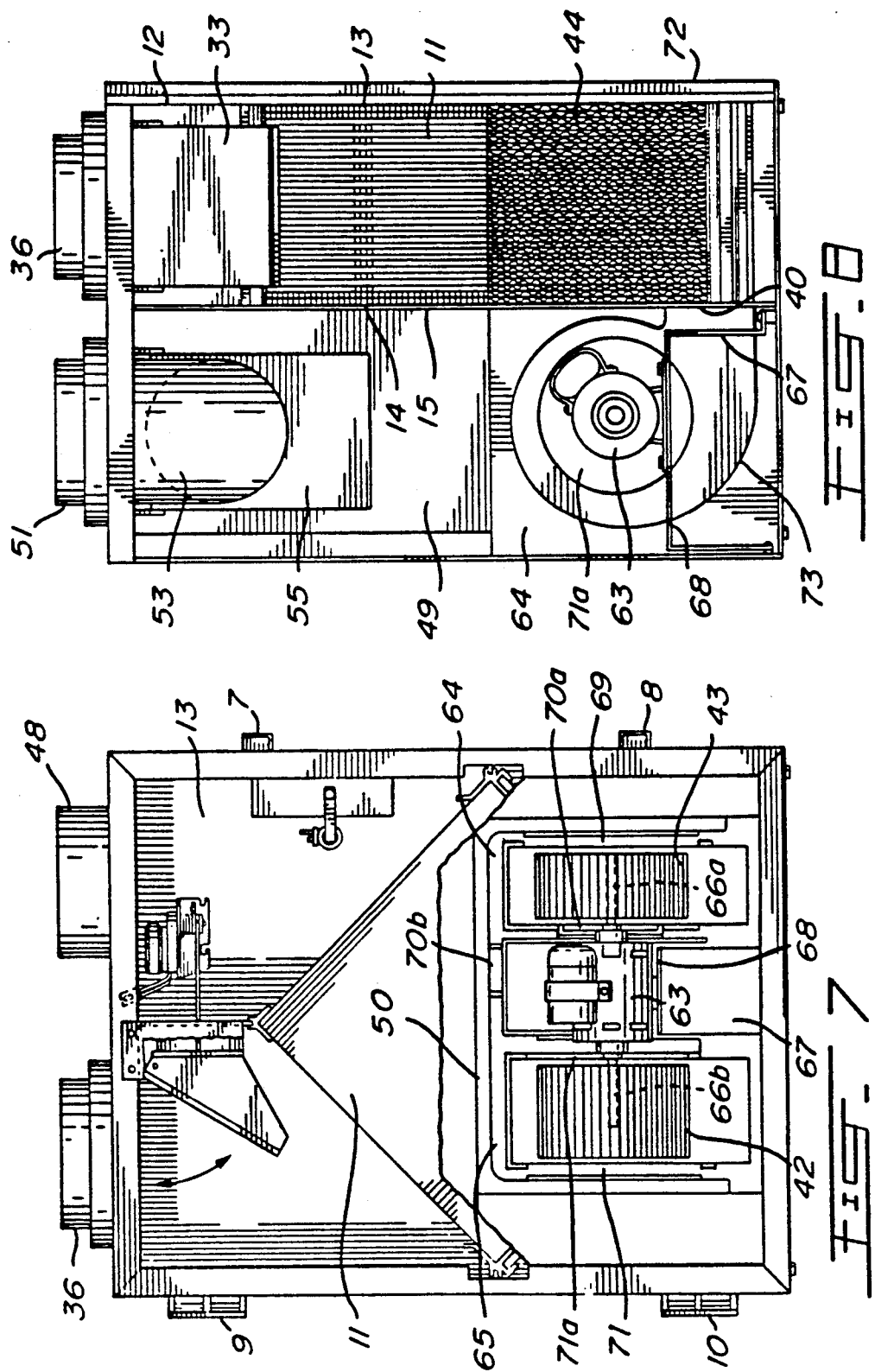

DEFROSTABLE VENTILATION SYSTEM

BACKGROUND OF THE INVENTION

The present invention relates to an apparatus for defrostable ventilation systems which include an element for the transfer of heat from warm exhaust air (taken from inside a building) to cooler exterior fresh air (drawn into the building), the system using warm interior air as defrost air for defrosting the system during cool weather.

Heat recovery ventilation systems are known whose function is to draw fresh exterior air into a building and to exhaust stale interior air to the outside. The systems are provided with appropriate ducting, channels and the like which define a fresh air path and an exhaust air path whereby with the interior air of a building and the exterior ambient air may be exchanged; during ventilation the air in one path is not normally allowed to mix with the air in the other path. A heat recovery ventilator device which forms part of such a system is provided with corresponding air paths and also one or more heat exchange elements or cores.

Heat recovery ventilation devices may also have a housing or cabinet; such enclosures may for example be of sheet metal construction (e.g. the top, bottom, side walls and any door, etc. may be made from panels of sheet metal). The heat exchanging element(s), as well as other elements of the device such as, for example, channels or ducts which define air paths, filtration means, insolation and if desired one or more fans for moving air through the fresh air and exhaust air paths may be disposed in the enclosure. Such ventilation devices may be disposed on the outside of or within a building such as a house, commercial building or the like; appropriate insulation may be provided around any duct work needed to connect the device to the fresh air source and the interior air of the building.

A problem with ventilation equipment used to extract heat from exhaust air, is the production of frost or ice in the exhaust path of the system. During cold weather, prior to expelling the relatively warm exhaust air, the equipment provides for the transfer of heat from the relatively warm exhaust air to the relatively cool (fresh) outside air by the use of a suitable heat exchange element. However, since the warm interior air will usually contain a certain amount of moisture, the cooling of the interior air can result in the formation not only of water but of ice if the exterior air is below the freezing point of water. An uncontrolled buildup of ice on the exhaust air side of the system can result in decreased heat transfer, and even outright blockage of the exhaust air path. Accordingly a means of periodically defrosting such a system is a requirement in order to maintain it's efficiency.

A defrost mechanism is, for example, proposed in U.S. Pat. No. 5,002,118. In accordance with the teachings of this patent the fresh air intake is periodically blocked off by a damper and warm interior air is injected, via a separate defrost air conduit, into the fresh air inlet side of the fresh air path of the ventilation apparatus. However, during the defrost cycle of this known system, stale inside air is still exhausted to the outside via the exhaust air path; this is disadvantageous since by blocking only the fresh air inlet and continuing to exhaust interior air to the outside, a negative air pressure can be built up in the interior of a building relative to the exterior atmosphere. Such a negative pressure may induce uncontrolled entry of air through any cracks and crannies in the structure of the building; the negative pressure may, in particular, produce a backdraft effect, for oil and gas type heating systems, whereby exterior air may be pulled into the chimney leading to the accumulation of gaseous combustion products in the building. The above mentioned patent does not address this type of problem.

It would therefor be advantageous to have a system which can use interior air as defrost air while diminishing or avoiding the creation of a negative air pressure in the building.

It would also be advantageous to have a defrostable ventilation apparatus of the kind described herewithin which is of simple construction.

SUMMARY OF THE INVENTION

The present invention deals with the problem of negative air pressure inducement by providing air path control means whereby, during a defrost cycle, the interior defrost air may circulate through both of the fresh air and exhaust air paths of a defrostable ventilation apparatus for delivery back into the building, i.e. the warm interior air may be confined to circulate from the interior of the building into the ventilation apparatus and back to the interior of the building.

Thus, the present invention provides a defrostable ventilation apparatus, for exchanging air between the interior and exterior of a building, for transferring heat from exhaust air taken from the building to fresh air taken from the exterior ambient air for delivery to the building, and wherein air from the interior of the building is used as defrost air to defrost the ventilation apparatus, said ventilation apparatus having a fresh air path means having a fresh air intake side and a fresh air discharge side, an exhaust air path means having an exhaust air intake side and an exhaust air discharge side, heat exchanger means consisting of heat recovery means for the transfer of heat between exhaust air and fresh air, said heat recovery means comprising one or more air-to-air heat exchanger elements, each of said air-to-air heat exchanger elements comprising a first air path defining a portion of said fresh air path means between the intake and discharges sides of said fresh air path means and a second air path defining a portion of said exhaust air path means between the intake and discharge sides of said exhaust air path means, each of said air-to-air heat exchanger elements having air-to-air heat exchanging walls between said first and second air paths, a first defrost air path means for conveying defrost air to said fresh air intake side, and a first defrost damper, said first defrost damper being displaceable between a ventilation configuration and a defrost configuration, characterized in that said ventilation apparatus includes a second defrost air path means for conveying defrost air from said exhaust air discharge side, and a second defrost damper, said second defrost damper being displaceable between a ventilation configuration and a defrost configuration, and wherein in said ventilation configuration, said first and second defrost dampers respectively close off said first and second defrost air path means such that during a ventilation cycle fresh air flow is confined to said fresh air path means and exhaust air flow is confined to said exhaust air path means, and in said defrost configuration, said first defrost damper closes off said fresh air intake side and said second defrost damper closes off said exhaust air discharge side such that during a defrost cycle, defrost air taken from the building, is able to circulate, for delivery back into the building, through said exhaust air intake side, through said first defrost path means, through the first and second air paths of said heat exchanger element, through said second defrost path means and through said fresh air discharge side.

In accordance with the present invention the first, second or both defrost air path means may comprise separate and distinct air paths. A separate first defrost (stale) air path may, for example, be provided for introducing warm stale air into the fresh air inlet side of the apparatus' fresh air path; a separate second defrost air discharge path may additionally be provided for delivering the spent defrost air from the exhaust air discharge side of the apparatus' exhaust path, back into the building. For such an embodiment of the present apparatus, six distinct air paths would be required in order for the apparatus to provide both a ventilation and a defrost cycle. More particularly, if such an embodiment of the present invention were, for example, to be housed in a single cabinet, the cabinet would need six air openings, namely, two for the defrost air, two for the fresh air and two for the exhaust air; for such an embodiment of the present invention, during the ventilation cycle the two defrost openings would be blocked and the other four openings would be in use whereas during the defrost cycle the fresh air and exhaust air discharge openings would be blocked and the other four openings would be in use.

Alternatively, in accordance with a preferred aspect of the present invention, the first defrost air path means may be configured to take warm defrost air from the exhaust air inlet side of the apparatus' exhaust path and deliver it to the fresh air inlet side of the apparatus' fresh air path; the second defrost air path means may also be configured to take spent defrost air from the exhaust air discharge side of the apparatus' exhaust air path and deliver the defrost air to the fresh air discharge side of the apparatus' fresh air path for subsequent delivery back into the building. For this preferred embodiment of the present apparatus only four distinct air paths would be required in order for the apparatus to provide both a ventilation and a defrost cycle. More particularly, if such a preferred embodiment of apparatus of the present invention were, for example, to be housed in a single cabinet, the cabinet would need only four openings, namely, two for the fresh air and two for the stale air; for such a preferred example embodiment of the present invention, during the ventilation cycle, the two defrost air paths would be blocked and the four openings would be in use whereas during the defrost cycle the fresh air and exhaust air discharge openings would be blocked, the defrost air paths would be unblocked and only the remaining two openings would be respectively in use as inlet and outlet for the defrost exhaust air. The preferred type of apparatus may in this way give rise to a relatively compact ventilation heat exchange module. Although specific mention has been made to blocking off openings it is to be understood that blockage may occur at any suitable point along the air paths provided that air is able to circulate as herein described during the ventilation and defrost cycles.

Thus, in accordance with a preferred aspect, the present invention provides a defrostable ventilation apparatus, for exchanging air between the interior and exterior of a building, for transferring heat from exhaust air taken from the building to fresh air taken from the exterior ambient air for delivery to the building, and wherein air from the interior of the building is used as defrost air to defrost the ventilation apparatus, said ventilation apparatus having a fresh air path means having a fresh air intake side and a fresh air discharge side, an exhaust air path means having an exhaust air intake side and an exhaust air discharge side, heat exchanger means consisting of heat recovery means for the transfer of heat between exhaust air and fresh air, said heat recovery means comprising one or more air-to-air heat exchanger elements, each of said air-to-air heat exchanger elements comprising a first air path defining a portion of said fresh air path means between the intake and discharges sides of said fresh air path means and a second air path defining a portion of said exhaust air path means between the intake and discharge sides of said exhaust air path means, each of said air-to-air heat exchanger elements having air-to-air heat exchanging walls between said first and said second air paths, a first defrost air path means for conveying defrost air to said fresh air intake side, and a first defrost damper, said first defrost damper being displaceable between a ventilation configuration and a defrost configuration, characterized in that said first defrost air path means connects the fresh air intake side with the exhaust air intake side for conveying defrost air to said fresh air intake side from said exhaust air side, and in that said ventilation apparatus includes a second defrost air path means connecting the exhaust air discharge side with the fresh air discharge side for conveying defrost air from the exhaust air discharge side to said fresh air discharge side, and a second defrost damper, said second defrost damper being displaceable between a ventilation configuration and a defrost configuration, and wherein in said ventilation configuration, said first and second defrost dampers respectively close off said first and second defrost air path means such that during a ventilation cycle fresh air flow is confined to said fresh air path means and exhaust air flow is confined to said exhaust air path means, and in said defrost configuration, said first defrost damper closes off said fresh air intake side and said second defrost damper closes off said exhaust air discharge side such that during a defrost cycle, defrost air, taken from the interior of the building, is able to circulate through said exhaust air intake side, through said first and second defrost air path means, through the first and second air paths of said heat exchanger element and exit the apparatus through said fresh air discharge side.

In accordance with the present invention the first and second defrost air path means may take the form of openings in suitably disposed partition walls separating the various air paths; the first and second defrost dampers may for example block and unblock such openings depending on whether a ventilation or defrost configuration is desired.

Fan means for moving air through the air paths of the apparatus may be disposed outside the apparatus (i.e. the fans may form part of the overall ventilation ductwork of the building); alternatively fan means may be integrated with the apparatus itself, the latter being preferred. The apparatus, for example, may comprise a blower assembly having motor(s), blower wheels, blower housing, etc. ... The blower assembly may have a single motor; two blower wheels may be mounted directly on the shaft of such motor. The blower assembly may also include separate blower housing for each of the blower wheels, with one blower wheel being disposed in each of the fresh air and exhaust air paths.

In accordance with the present invention the defrostable ventilation apparatus may take the form of a module having a housing or cabinet in which is disposed the various elements thereof (e.g. the air paths, dampers, etc.). The heat exchanger element(s) preferably take the form of the heat exchange element as shown in U.S. Pat. No. 5,002,118 the contents of which are incorporated herein by reference. Thus the heat exchange element(s) may have the form of rectangular parallelepiped and may have a first air path and a second air path which are disposed at right angles to each other; the element(s) may be disposed such that the first and second air paths are diagonally oriented so that they are self draining (i.e. with respect to any condensed or unfrozen water); a single heat exchanger element may for example be used as herein described. Air filters may also be provided for each of the air paths.

The nature and construction of the various elements of an apparatus in accordance with the present invention will of course depend on the volumes of air it is desired to handle and the heat recovery efficiency.

Keeping the above in mind, the present invention will be particularly describes by reference to the accompanying drawings which illustrate an example embodiment of the present invention.

DESCRIPTION OF THE DRAWINGS

FIG. 2 is a front view of a defrostable ventilation apparatus in accordance with the present invention with the front door of the cabinet removed;

FIG. 3 is a rear view of the defrostable ventilation apparatus shown in FIG. 2 with the rear wall of the cabinet removed;

FIG. 7 is a front view of the defrostable ventilation apparatus shown in FIG. 2 with the front door of the cabinet removed and the heat exchange element and a partition wall partially cut away showing the interior of the blower assembly; and FIG. 8 is side view of the defrostable ventilation apparatus shown in FIG. 2 with the side wall of the cabinet removed and the heat exchange element and the blower assembly housing partially cut away.

In the drawings like reference characters indicate corresponding parts in the different figures.

DETAILED DESCRIPTION

Figure 1A:
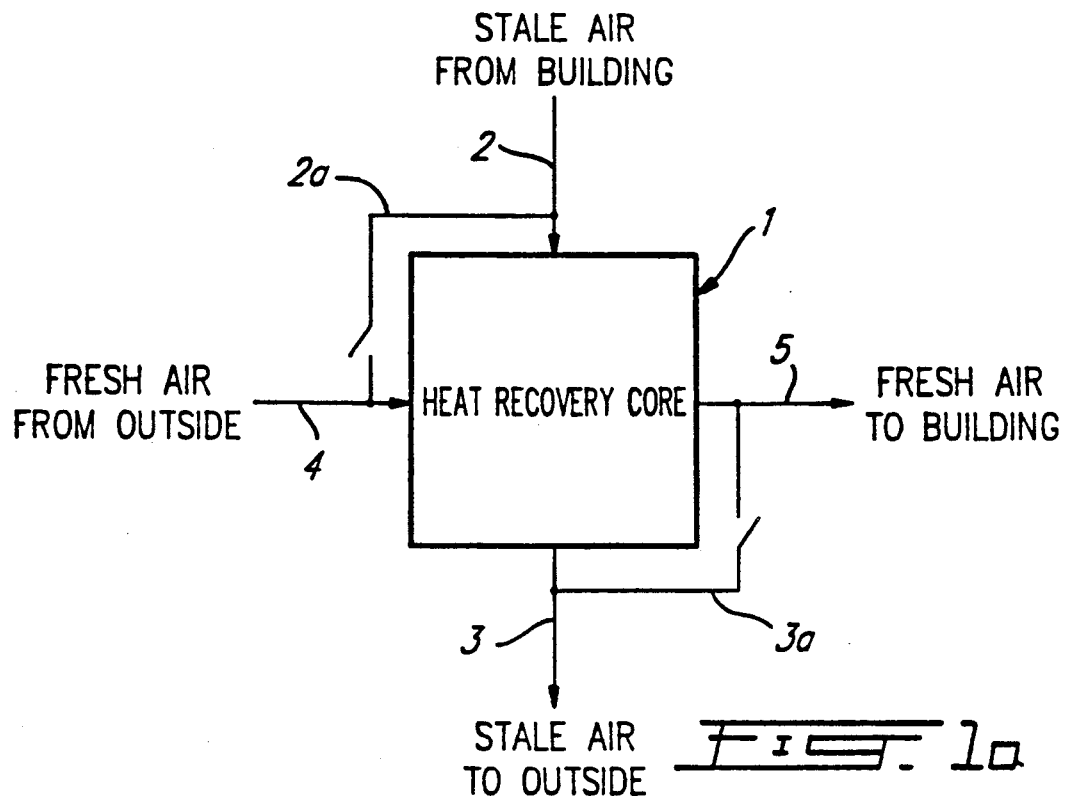
FIG. 1a is a schematic showing the air paths of the ventilation system of the present invention in the ventilation configuration.
Figure 1B:
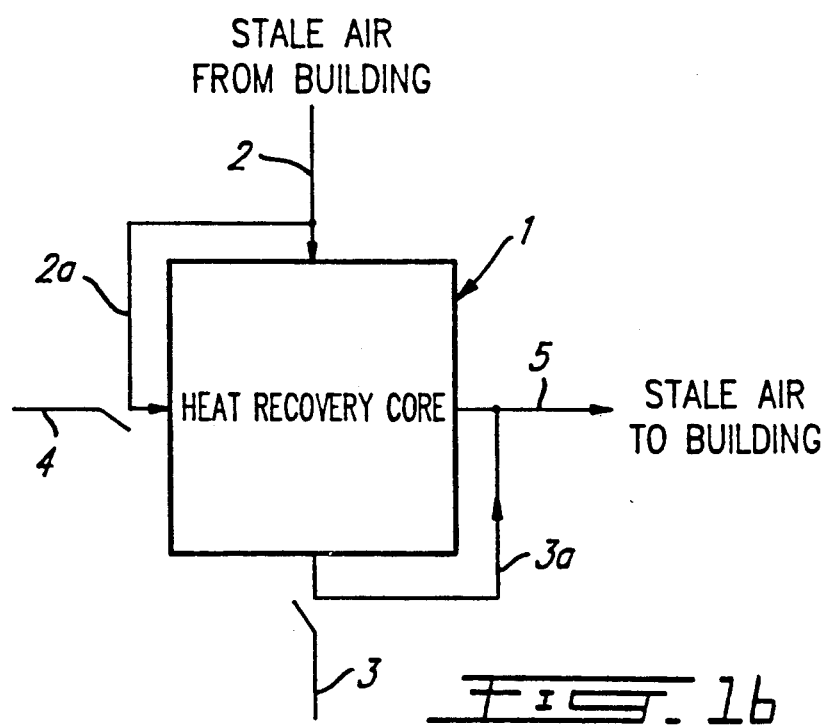
FIG. 1b is a schematic showing the air paths of the ventilation system of the present invention in the defrost configuration.

Referring to FIGS. 1a and 1b, these show, in a general schematic manner, the disposition of the flow of air through a heat exchange element or heat recovery core in accordance with the present invention. In these two figures the heat recovery core is generally designated with the reference number 1; the same reference numerals are used to designate the air paths in both of these figures as well.

Thus in FIGS. 1a and 1b there are four main air path elements, namely the air path 2 for delivering exhaust or stale air from the building to the heat recovery core, air path 3 for exhausting the stale air which has passed through the heat recover core 1 to the exterior of the building, air path 4 for delivering fresh air to the heat recovery core and air path 5 for delivering fresh air which has passed through the heat recover core 1 to the interior of the building. There are also two defrost air paths, namely defrost air paths 2a and 3a.

FIG. 1a, represents a ventilation configuration for a ventilation system in accordance with the present invention; thus the defrost air paths 2a and 3a are closed off as is represented symbolically by the break in these paths. In accordance with FIG. 1a exhaust air will pass through air path 2, through the heat recovery core 1 and through the air path 3 for delivery to the exterior of the building. On the other hand, fresh air will pass through air path 4, through the heat recovery core 1 and through the air path 5 for delivery to the interior of the building.

FIG. 1b, represents a defrost configuration for a ventilation system in accordance with the present invention; thus the defrost air paths 2a and 3a are open while the air paths 3 and 4 are blocked as is represented symbolically by the break in these latter paths. In accordance with FIG. 1b, fresh air will not pass into the core 1 because air path 4 is blocked off; exhaust or stale air will also not be exhausted to the exterior of the building since air path 3 is also blocked off. On the other hand, exhaust or stale air will now pass through air paths 2 and 2a, through the heat recovery core 1 and through the air paths 3a and 5 for delivery back to the interior of the building; in this way the core 1 is defrosted without inducing any substantial negative air pressure in the building.

FIG. 2 shows a preferred construction of the defrostable ventilation apparatus of the present invention.

The apparatus shown in FIG. 2 includes a cabinet indicated generally by the reference number 6. In FIG. 2, the door (not shown) of the cabinet has been removed; the door when present in hingedly attached to the hinge members 7 and 8 and may be kept shut for example by snap locking members 9 and 10 which cooperate with members on the door. The cabinet 6 is preferably provided with insulated walls and partition walls (at least for the fresh air intake side, the fresh air discharge side and the exhaust air discharge side).

A heat exchange element or (heat recovery) core 11 is mounted in the cabinet 6. Although one such core 11 is shown it will nevertheless be appreciated that two or more such cores may, if desired, be used provided that appropriate modifications are made to the partitioning members so as to accommodate the required air flow patterns.

Referring to FIG. 8, the entire inside face of the door is provided with a layer of sponge like insulating material 12 or the like which when the door is shut facilitates the sealing of the cabinet and also sealingly engages the front face 13 of the core 11. The rear face 14 of the core 11 sealingly abuts the partition wall indicated generally by the reference number 15.

Returning to FIG. 2, the core 11 has a rectangular parallelepiped shape and is constructed generally as described in the U.S. Pat. No. 5,002,118 mentioned above. Thus, the core 11 has first and second air paths. The first air path is defined by a plurality of channels one of which is shown designated by the reference number 16; the second air path is also defined by a plurality of channels one of which is shown designated by the reference number 17. As can be seen the air paths of the core 11 are disposed at right angles to each other; the air paths are also separated by heat exchanging walls.

The core 11 is mounted in the cabinet 6 such that the air paths are diagonally disposed (e.g. about 45 degrees from the vertical) so that they are self draining; any moisture from the exhaust air including moisture caused by defrosting will drain downwardly for collection in a drain pan (not shown) from which it may be removed in any convenient manner.

The corners 18, 19, 20 and 21 of the core 11 are provided with slidable sealing engagement members 22, 23, 24 and 25 so that the core 11 may be removed for cleaning, replacement, repair, etc.; FIGS. 2a and 2b show in more detail the sliding engagement members 22 and 25. The sealing engagement members have L-shaped elements the inner angle part of which embraces a corresponding corner of the core 11. Each of the sealing engagement members is also provided with a sealing groove element which extends outwardly from the L-shaped element from a respective corner (see for example sealing groove element 22a in FIG. 2a). Each sealing groove element extends from the front face 13 to the rear face (14 in FIG. 8) of the core 11 such that when the door is closed one end of each sealing engagement member will sealingly abut the partition wall 15 and the opposite end will so abut the door insulating material 12. The sliding engagement members are connected to a respective top wall 26, side wall 27, bottom wall 28 and/or side wall 29 (as the case may be) by a sliding and sealing engagement of each sealing groove with a sliding rail element of a respective wall extension member. The wall extension members may comprise only a rail fixed to a wall(s) or may, as desired or necessary, extend from other extension elements which are fixed to wall(s); for example, the wall extension member which engages with the sliding engagement member 22 also includes the partition wall 30. The partition wall 30 is shown in FIG. 2 on edge; in FIG. 2a a portion of the rail 22b is shown which is integral with the partition wall 30. The wall extension members including the rail elements extend forwardly from partition wall 15 up to the front door.

The sealing engagement members and the wall extension members are so constructed that they removeably and slidingly engage with a sufficient sealing character such that when the door of the cabinet is closed four corner air pockets are defined in the interior of the cabinet 6 about the core 11. The core 11 may be removed by sliding it out of position and vis versa to install it.

As shown in FIG. 2 partition wall 30 extends perpendicularly to the plain of the sheet of paper; it also has a support bracket 31. The partition wall 30 extends from the partition wall 15 to a point at the front of the cabinet sufficient to allow it to sealingly engage the material 12 fixed to the cabinet door when the door is closed. A part of the bracket 31 is shown as being cut away so as to expose the defrost opening 32 (which traverses the partition wall 30) and the damper member 33. The damper member 33 is so sized and shaped such that as shown in FIG. 2 a side 33a of the damper member can block off the defrost opening 32 so that air cannot go through this opening (i.e. in the ventilation configuration). The damper member 33 is hinged at pivot point 34 by a rod which passes through the upper part of the body of the damper member 33. The rod is rotatably engaged by a correspondingly shaped opening in the body of the damper member, the rod being fixed at one end thereof to the partition wall 15 and at the other end to the bracket 31. The rod and its related opening in the damper body are sized and configured so that the damper member 33 can be rotatably displaced in the direction of the arrow 35 between the ventilation configuration and the defrost configuration; in the latter configuration the exhaust air opening in the top wall 26 (around which is disposed the duct collar 36) will be blocked off by the appropriately sized side 33b of the damper member 33 and the defrost opening 32 will at the same time be unblocked.

The damper member 33 is displaced between the ventilation configuration and the defrost configuration by means of a motor 37 and rod 38 arrangement which includes a spring member 39 for biasing the damper member 33 in one configuration, the motor 37 being used to displace the damper member 33 to the other configuration.

Figure 2C:
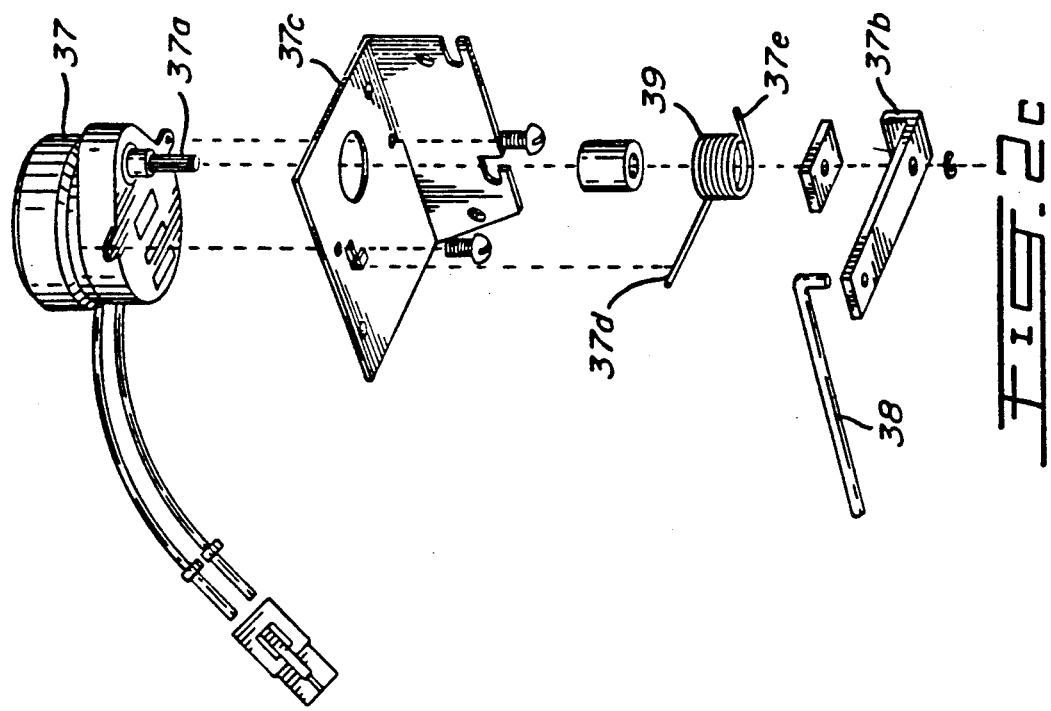
FIG. 2c is an exploded perspective view of a motorized assembly for the displacement of a defrost damper member.
Figure 2B:
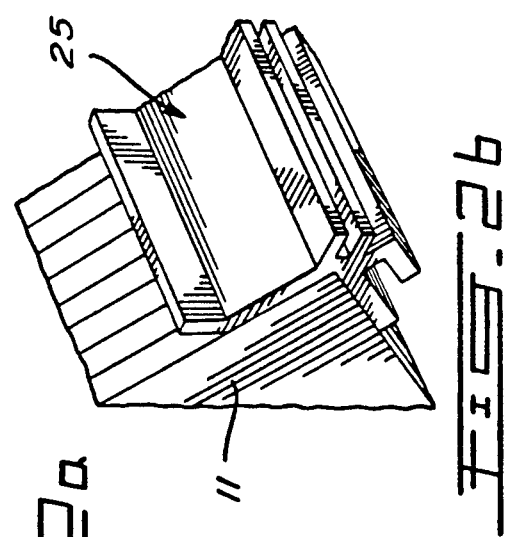
FIG. 2b is a partial perspective view of another sealing engagement member.
Figure 2A:
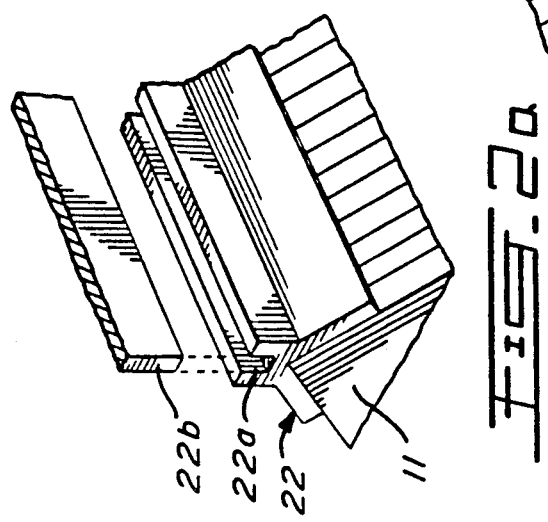
FIG. 2a is a partial perspective view of a sealing engagement member and a sliding rail element.

Referring to FIG. 2c the motor-rod assembly is shown in more detail. Thus the motor 37 has a shaft 37a which is fixed to an actuating arm 37b; the motor is fixed to a support platform 37c which is in turn fixed to the partition wall 15. One end of the rod 38 is rotatably disposed in a hole at the distal end of the actuating arm 37b while the other end of rod 38 is rotatably fixed in a similar manner (not shown) to the damper member 33; i.e. via a small plate/hole member fixed to the damper member. The spring member 39 is a (helical) coil spring disposed around the shaft 37a; one end 37d of the coil is fixed with respect to the platform (see dotted line) and the other end 37e is fixed to the actuating arm 37b so as to bias the rod 38 (and thus the damper member) with respect to one configuration. Activation and deactivation of the motor will thus cause the damper to be displaced between the ventilation and defrost configurations. Any suitable motor (such as for example a synchronous motor as made by Hansen Manufacturing Company, Inc.) may for example be used for this purpose. Any other suitable damper mechanism may of course be used, keeping in mind that the purpose of the damper is to block off the appropriate air path for the ventilation cycle and the defrost cycle while leaving the other necessary air paths unobstructed.

Referring back to FIG. 2, fresh air opening 40 and exhaust air opening 41 are provided which pass through the partition wall 15 at the foot thereof. The fresh air blower wheel 42 can be seen through the opening 40; the exhaust air blower wheel 43 can be seen through the opening 41. These blower wheels form part of the blower assembly which shall be described below with reference to FIGS. 7 and 8. The apparatus also includes air filters 44 and 45; only parts of which are shown.

In FIG. 2 the apparatus is shown as being in a ventilation configuration. In this configuration:

exhaust air will proceed from the opening 41 into the lower right air pocket in the direction of the arrow 46a; the exhaust air will then pass through the core 11 into the upper left air pocket in the direction of the arrow 46b; the exhaust air will finally pass through to the exterior atmosphere in the direction of the arrow 46c.

fresh air will proceed from the opening 40 into the lower left air pocket in the direction of the arrow 47a; the fresh air will then pass through the core 11 into the upper right air pocket in the direction of the arrow 47b; the fresh air will finally pass through the opening in the top wall 26 (surrounded by duct collar 48) in the direction of the arrow 47c for delivery to the interior of the building.

FIG. 3 shows the apparatus of FIG. 2 with the rear wall removed. The view shown is of the rear side of the partition wall 15. The part of the cabinet on this side of the portion wall 15 has a portion wall 49 (perpendicular to partition wall 15) and a blower housing 50 in which is disposed fan means for moving air through the apparatus. The partition wall 49 and the housing 50 partition this side of the cabinet interior into an exhaust air inlet pocket and a fresh air inlet pocket. The housing 50 has side openings (not shown here, but see FIG. 7) for communicating with each air pocket. The duct collars 51 and 52 respectively encircle openings in the top wall 26 for exhaust air and fresh air. The opening in the top wall leading to the fresh air pocket is encircled on the interior with a collar 53; collar 53 has a lower mouth which is cut at an inclined angle.

The partition wall 49 is provided with a defrost opening 54. A damper member 55 is also provided. The damper member 55 is sized and shaped such that as shown in FIG. 3 a side 55a of the damper member can block off the defrost opening 54 so that air cannot go through this opening (i.e. in the ventilation configuration). The damper member 55 is hinged at pivot point 56 in a manner similar to that of the damper member 33 i.e. so that damper member 55 can be rotatably displaced in the direction of the arrow 57 between the ventilation configuration and the defrost configuration; in the latter configuration (dotted image of the damper member 55) the fresh air opening in the top wall 26 (around which is disposed the duct collar 53) will be blocked off by the appropriately sized side 55b of the damper member 55 and the defrost opening 54 will at the same time be unblocked.

The damper member 55 is displaced between the ventilation configuration and the defrost configuration by means of a motor 58 and rod 59 arrangement which includes a spring member 60 for biasing the damper member 55 in one configuration, the motor being used to displace the damper member 55 to the other configuration; the motor-rod assembly takes the same form as the assembly shown in FIG. 2c.

In FIG. 3 the apparatus is shown as being in a ventilation configuration. In this configuration:

exhaust air will proceed from the opening encircled by the collar 51 into the left exhaust air pocket in the direction of the arrow 61a; the exhaust air will then pass through a side opening and a top opening (not shown) in the housing 50 in the direction of the arrows 61b; the exhaust air will finally pass through to the blower means and on to opening 41 (see FIG. 2).

fresh air will proceed from the opening encircled by the collars 52 and 53 into the right fresh air pocket in the direction of the arrow 62a; the fresh air will then pass through a side opening (not shown) in the housing 50 in the direction of the arrow 62b; the fresh air will then pass through to the blower means and on to opening 40 (see FIG. 2).

The sides 33a, 33b, 55a and 55b of the damper members 33 and 55 may, for example, be provided with a layer of sponge like resilient material or the like in order to facilitate the sealing of the various openings to be blocked by these members; such layers are shown in FIGS. 2 and 3 by the narrow strips on the blocking sides of the members.

Referring to FIGS. 4a, 4b, 5a, 5b, 6a and and 6b, these figures illustrate in a schematic manner the disposition of the partitioned air pockets of the apparatus shown in FIGS. 2 and 3, the general structure of the partitioning members and the consequent flow of air through the apparatus during the ventilation cycle and the defrost cycle; (the same reference numbers as used in FIGS. 2 and 3 are as far as possible used with respect to these latter figures; in FIGS. 5a and 6a, the blower housing is, for illustration purposes only, not shown, partition wall 49 being shown instead as extending right up to the bottom wall 28).

Figure 4A:
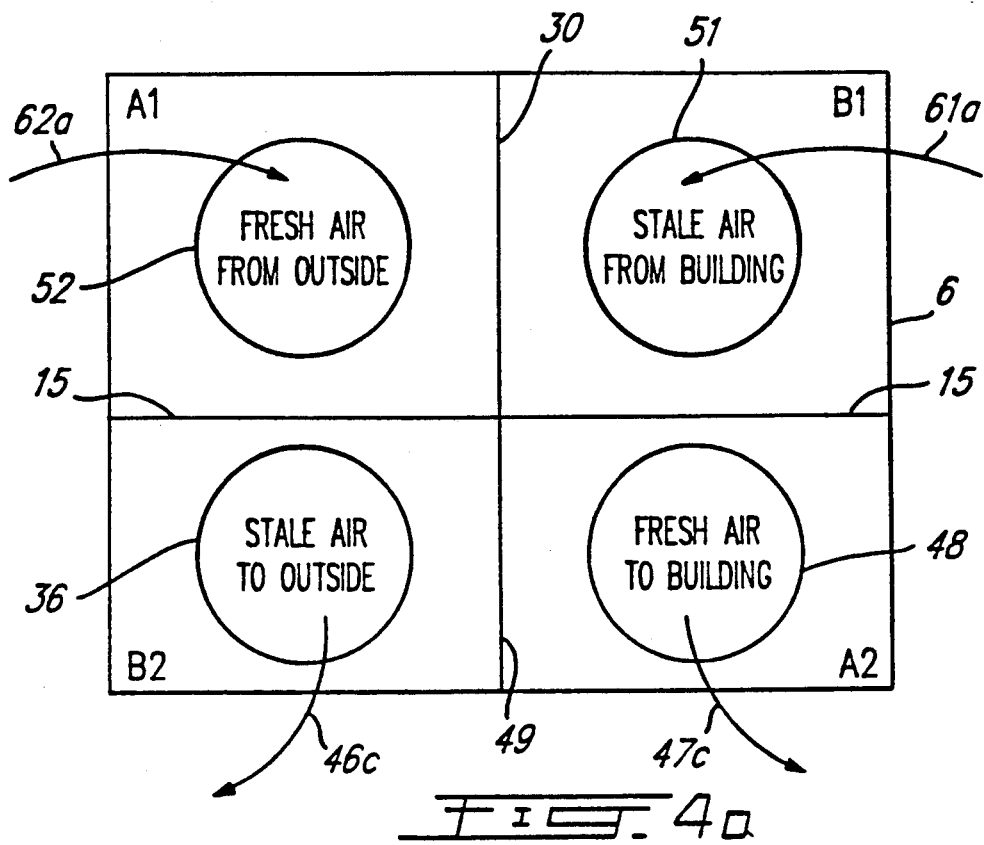
FIG. 4a is a partial schematic top view of the defrostable ventilation apparatus shown in FIG. 2 in the ventilation configuration.

FIG. 4a shows a view of the top of the apparatus, in a ventilation configuration, with the attendant air flows numbered as in FIGS. 2 and 3. As can be seen the interior of the cabinet 6 is partitioned into a number of air pockets by partition members such as partition walls 15, 30 and 49. The dampers (not shown in FIG. 4a) block off the openings 32 and 54 in the partition walls 30 and 49 such that during a ventilation cycle fresh air flow is confined to the fresh air path defined in the cabinet and the exhaust air flow is confined to the exhaust air path also defined in the cabinet.

Figure 5A:
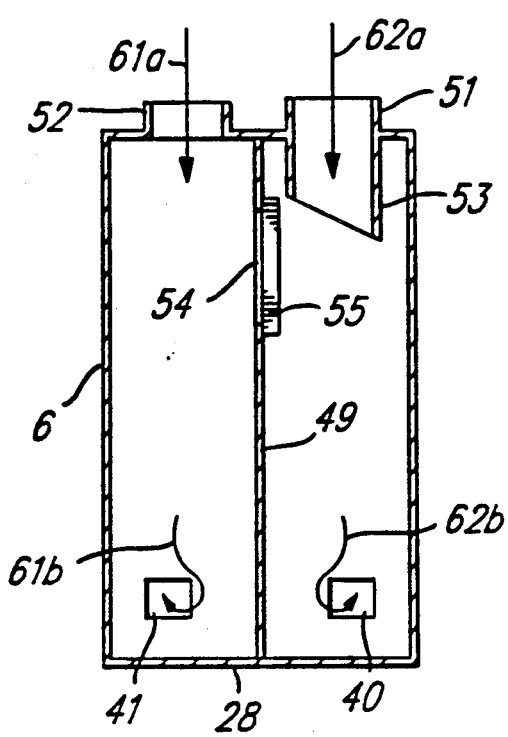
FIG. 5a is a partial schematic rear view of the defrostable ventilation apparatus shown in FIG. 2, with the rear wall removed, in the ventilation configuration.
Figure 5B:
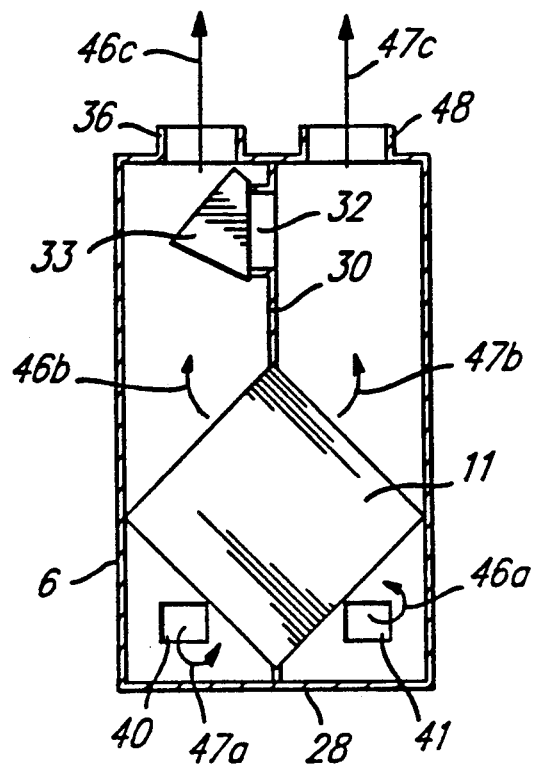
FIG. 5b is a partial schematic front view of the defrostable ventilation apparatus shown in FIG. 2, with the front door removed, in the ventilation configuration.

Thus, as may be seen in FIGS. 5a and 5b, exhaust air is confined to the air path outlined by the arrows 61a, 61b, 46a, 46b and 46c; on the other hand the fresh air is confined to the air path outlined by the arrows 62a, 62b, 47a, 47b and 47c.

Figure 4B:
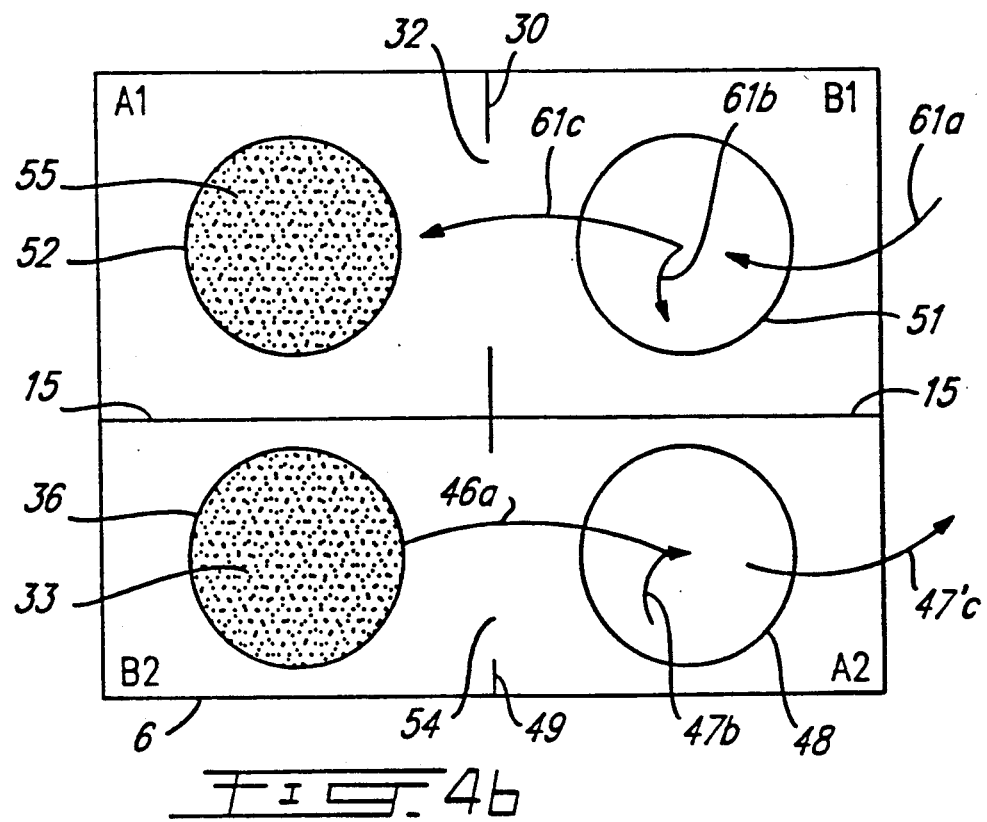
FIG. 4b is partial schematic top view of the defrostable ventilation apparatus shown in FIG. 2 in the defrost configuration.

FIG. 4b shows the apparatus in a defrost configuration with corresponding attendant air flows. In this configuration the fresh air inlet side of the fresh air path is blocked off by the damper 55; the exhaust air outlet side of the exhaust air path is also blocked off by the damper 33. At the same time, the defrost openings 32 and 54 are no longer obstructed by the damper members. The input exhaust air shown by arrow 61a is split into two air streams shown by arrows 61b and 61c. On the other hand the air delivered back to the building denoted by the 47'c is composed of two merged air streams denoted by the arrows 46d and 47b.

Figure 6A:
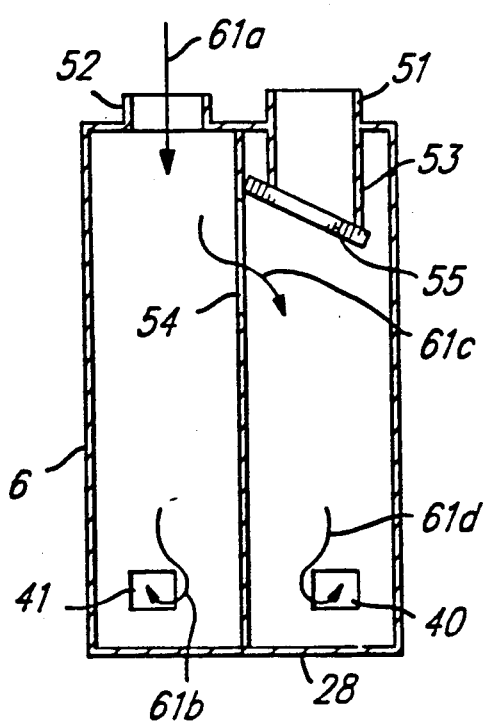
FIG. 6a is a partial schematic rear view of the defrostable ventilation apparatus shown in FIG. 2, with the rear wall removed, in the defrost configuration.
Figure 6B:
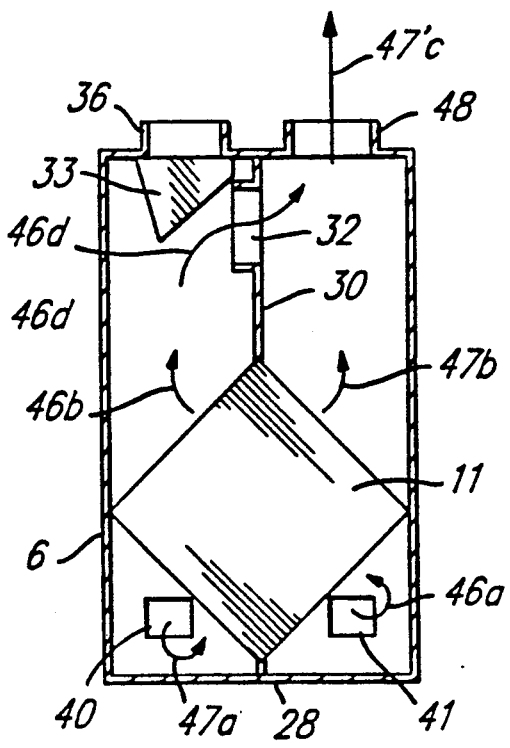
FIG. 6b is a partial schematic front view of the defrostable ventilation apparatus shown in FIG. 2, with the front door removed, in the defrost configuration.

Thus, as may be seen in FIGS. 6a and 6b, fresh air is excluded from the apparatus and the exhaust air path to the exterior of the building is also blocked off. At the same time, exhaust or stale warm air from the interior of the building circulates through the apparatus as outlined by the arrows 61a, 61b, 61c, 61d, 46a, 47a, 47b, 46b, 46d and 47'c.

Turning to FIGS. 7 and 8, the same reference numerals will be used with respect of those elements which are common with the elements referred to in FIGS. 2 and 3. FIGS. 7 and 8 provide a more detailed view of the blower assembly of the apparatus.

FIG. 7 shows the apparatus as illustrated in FIG. 2 but with a portion of the interior structure removed so as to expose the interior of the blower housing 50. A motor 63 is disposed within the housing 50. The blower housing 50 has two blower housing portions 64 and 65 which are disposed on either side of the motor 63; the two blower wheels 42 and 43 are disposed in respective blower housing portions; the two blower wheels 42 and 43 are also disposed on opposite sides of the motor 63 and are mounted directly on corresponding ends 66a and 66b of the shaft of the motor 63.

The blower housing 50 (including portions 64 and 65) is made of an expanded polystyrene material and is spaced apart from motor 63. The motor 63 is disposed on a stiff bracket 67. The motor 63 is rigidly joined by a suitable fixation means (such as nut/bolt) to the shelf member 68 of the bracket 67. Preferably the motor is fixed to a stiff bracket in the manner described in the co-pending U.S. Pat. application Ser. No. 785,058; i.e. apart from stiff corner edges of the cabinet, the stiff bracket 67 does not contact other elements of the apparatus; the other elements include elements such as insolation, dividing walls, etc..

The blower housing portion 64 is provided with exhaust air (intake) openings 69 and 70a; the end 66a of the (motor) shaft extends through the opening 70a. The blower housing 50 has an additional opening 70b in the top part thereof which also communicates with the exhaust air inlet pocket; i.e. exhaust air may thus enter the blower housing portion 64 not only via opening 69 but also via openings 70a and 70b. For the openings 70a and 70b, exhaust air passes through the opening 70b, around the motor (providing a cooling effect therefore) and then passes through the opening 70a.

The blower housing portion 65 on the other hand is provided with a fresh air (intake) opening 71 but does not have an opening corresponding to the opening 70a. The blower housing portion 65 has in place of such opening a wall 71a which is provided with an opening which is large enough to allow the end 66b of the (motor) shaft to rotatably pass therethrough but small enough to stop or impede the passage of exhaust air into the interior of the housing portion 65; if desired or necessary, however, any suitable sealing gasket means may be disposed around the shaft in the hole to provide an airtight seal.

FIG. 8 shows a side view of the apparatus illustrated in FIGS. 2 and 3 with the side wall removed to expose the internal elements. These elements include the heat recovery core 11, air filter 44 (these are all of known construction—see for example U.S. Pat. No. 5,002,118). For FIG. 8, the blower housing 65 and blower wheel 42 have been removed to expose the motor 63 and the blower housing 64. The exhaust air inlet opening 70 is hidden from view on the opposite side of the housing portion 64.

In FIG. 8, the door of the enclosure is present as indicated generally by the reference numeral 72.

In FIG. 8 the outline of the border of the blower channel in housing portion 64 is illustrated generally by the dashed line 73.

The cabinet can also, if desired, includes appropriate temperature sensor(s), electric wiring, control mechanisms for controlling the various motors for the ventilation and defrost cycles, etc.. (none of which is shown in the figures but which can be provided in any suitable or desired conventional manner). These mechanism may example include programmable computer type controls. The defrost cycle for example would normally be triggered by a thermistor or thermostat connected to a timer.

It is to be understood that the apparatus of the present invention may take many other forms without departing from the spirit and scope thereof as described in the present specification; the specific embodiment illustrated above being provided by way of illustrative example only.

What is claimed is:

1. A defrostable ventilation apparatus, for exchanging air between the interior and exterior of a building, for transferring heat from exhaust air taken from the building to fresh air taken from the exterior ambient air for delivery to the building, and wherein air from the interior of the building is used as defrost air to defrost the ventilation apparatus, said ventilation apparatus having
 a fresh air path means having a fresh air intake side and a fresh air discharge side,
 an exhaust air path means having an exhaust air intake side and an exhaust air discharge side,
 heat exchanger means consisting of heat recovery means for the transfer of heat between exhaust air and fresh air, said heat recovery means comprising one or more air-to-air heat exchanger elements,
 each of said air-to-air heat exchanger elements comprising
   a first air path defining a portion of said fresh air path means between the intake and discharges sides of said fresh air path means and
   a second air path defining a portion of said exhaust air path means between the intake and discharge sides of said exhaust air path means,
 each of said air-to-air heat exchanger elements having air-to-air heat exchanging walls between said first and second air paths,
 a first defrost air path means for conveying defrost air to said fresh air intake side, and
 a first defrost damper, said first defrost damper being displaceable between a ventilation configuration and a defrost configuration,
 characterized in that said ventilation apparatus includes
   a second defrost air path means for conveying defrost air from said exhaust air discharge side, and
   a second defrost damper, said second defrost damper being displaceable between a ventilation configuration and a defrost configuration, and wherein in said ventilation configuration,
said first and second defrost dampers respectively close off said first and second defrost air path means such that during a ventilation cycle fresh air flow is confined to said fresh air path means and exhaust air flow is confined to said exhaust air path means, and
in said defrost configuration,
said first defrost damper closes off said fresh air intake side and said second defrost damper closes off said exhaust air discharge side such that during a defrost cycle, defrost air taken from the building, is able to circulate, for delivery back into the building, through said exhaust air intake side, through said first defrost air path means, through the first and second air paths of said heat exchanger element, through said second defrost air path means and through said fresh air discharge side.

2. A defrostable ventilation apparatus, for exchanging air between the interior and exterior of a building, for transferring heat from exhaust air taken from the building to fresh air taken from the exterior ambient air for delivery to the building, and wherein air from the interior of the building is used as defrost air to defrost the ventilation apparatus, said ventilation apparatus having
a fresh air path means having a fresh air intake side and a fresh air discharge side,
an exhaust air path means having an exhaust air intake side and an exhaust air discharge side,
heat exchanger means consisting of heat recovery means for the transfer of heat between exhaust air and fresh air, said heat recovery means comprising one or more air-to-air heat exchanger elements,
each of said air-to-air heat exchanger elements comprising
a first air path defining a portion of said fresh air path means between the intake and discharge sides of said fresh air path means and
a second air path defining a portion of said exhaust air path means between the intake and discharge sides of said exhaust air path means,
each of said air-to-air heat exchanger elements having heat exchanging walls between said first and second air paths,
a first defrost air path means for conveying defrost air to said fresh air intake side, and
a first defrost damper, said first defrost damper being displaceable between a ventilation configuration and a defrost configuration,
characterized in that
said first defrost air path means connects the fresh air intake side with the exhaust air intake side for conveying defrost air to said fresh air intake side from said exhaust air side,
and in that said ventilation apparatus includes
a second defrost air path means connecting the exhaust air discharge side with the fresh air discharge side for conveying defrost air from the exhaust air discharge side to said fresh air discharge side, and
a second defrost damper, said second defrost damper being displaceable between a ventilation configuration and a defrost configuration, and wherein
in said ventilation configuration,
said first and second defrost dampers respectively close off said first and second defrost air path means such that during a ventilation cycle fresh air flow is confined to said fresh air path means and exhaust air flow is confined to said exhaust air path means, and
in said defrost configuration,
said first defrost damper closes off said fresh air intake side and said second defrost damper closes off said exhaust air discharge side such that during a defrost cycle, defrost air, taken from the interior of the building, is able to circulate through said exhaust air intake side, through said first and second defrost air path means, through the first and second air paths of said heat exchanger element and exit said apparatus through said fresh air discharge side.

3. The ventilation apparatus as defined in claim 2 wherein said fresh air path means, said exhaust air path means, each said heat exchanger element, said first defrost air path means, said second defrost air path means and said first and second defrost dampers are disposed in a cabinet,
wherein said fresh air intake side, said exhaust air discharge side, said fresh air discharge side and said exhaust air intake side each includes one respective air opening in a wall of said cabinet and
wherein, in said defrost configuration,
said first defrost damper closes off the air opening of said fresh air intake side and said second defrost damper closes off the air opening of said exhaust air discharge side.

4. A ventilation apparatus as defined in claim 2 wherein said apparatus has one said heat exchange element.

5. A ventilation apparatus as defined in claim 3 wherein said apparatus has one said heat exchange element.

6. A ventilation apparatus as defined in claim 2 wherein said fresh air path means includes fan means for moving fresh air through said fresh air path means and said exhaust air means includes fan means for moving exhaust air through said exhaust air path means.

7. A ventilation apparatus as defined in claim 3 wherein said apparatus has one said heat exchange element, said heat exchanger element is of a rectangular parallelepiped shape, the first and second air paths thereof are disposed at right angles to each other and the heat exchange element is so disposed in the cabinet such that the first and second air paths are diagonally oriented so that they are self draining.

8. A ventilation apparatus as defined in claim 7 wherein said apparatus includes fan means mounted in said cabinet for moving fresh air through said fresh air path means and for moving exhaust air through said exhaust air path means, said fan means comprising one motor and two blower wheels operatively connected thereto, said fresh air path means including one said blower wheel and said exhaust path means including the other said blower wheel.

* * * * *